UNITED STATES PATENT OFFICE.

CARL RUDOLPH ADOLPH GEORG SCHWIENING, OF BETTENHAUSEN, GERMANY.

MATCH.

SPECIFICATION forming part of Letters Patent No. 562,426, dated June 23, 1896.

Application filed April 4, 1896. Serial No. 586,167. (No specimens.) Patented in Germany December 22, 1893, No. 86,203.

*To all whom it may concern:*

Be it known that I, CARL RUDOLPH ADOLPH GEORG SCHWIENING, a subject of the German Emperor, and a resident of Bettenhausen, near Cassel, in the German Empire, have invented certain new and useful Improvements in the Manufacture of Igniting Compounds for Matches, (for which I have received a patent in Germany, No. 86,203, dated December 22, 1893,) of which the following is a specification.

The ignition of the so-called "Swedish matches" is caused, as is well known, by the explosion of the potassium chlorate contained in the heads of the matches, while being rubbed against the igniting-surface coated with a phosphorus compound.

It has often been attempted to render matches ignitible on any kind of frictional surfaces by employing for the head thereof an igniting compound which contains both the components requisite for the ignition, namely, potassium chlorate and red phosphorus mixed together. Such matches no doubt ignite on being rubbed on any surface whether rough or smooth, but experience has shown that with these matches very frequently only the head burns off without igniting the stem. This defect is caused by the fact that in consequence of the intimate mixture of phosphorus and potassium chlorate the combustion of the mass takes place very suddenly, as an explosion, not giving sufficient time for the front end of the stem to be raised to the igniting temperature.

The present invention relates to the manufacture of an igniting compound in which phosphorus and potassium chlorate are also employed mixed together but in which the rapidity of combustion is so much reduced that the stem is also ignited with certainty.

I have found that a portion of the potassium chlorate can be replaced by commercial calcium plumbate, or by other combinations of lead with other bases, and that in this mixture the plumbate has a similar action to potassium chlorate, giving off oxygen on ignition. The chemical decomposition of the plumbate, however, takes place considerably slower than that of the chlorate, so that in using a mixture of the two bodies the rapidity of combustion is retarded to a greater or less degree according to the proportion of plumbate added.

Proportions of admixture can be readily determined with which the combustion is sufficiently retarded to insure the ignition of the match-stem under all circumstances.

The following composition of a useful igniting compound is given by way of example: fifteen parts by weight of potassium chlorate; 0.5 part by weight of sulfur, four parts by weight of calcium plumbate, four parts by weight of terra sienna, two parts by weight of glass, 1.5 parts by weight of amorphous phosphorus, 1.5 parts by weight of gum or cementitious matter.

The gum, glass, and terra sienna can be replaced by other materials having the same properties and the sulfur can sometimes be entirely omitted. The only essential feature is the presence of the potassium chlorate, calcium plumbate, and phosphorus.

Having now particularly described and ascertained the nature of my said invention and in what manner the same is to be performed, I declare that what I claim is—

In an igniting compound for matches that will ignite on any frictional surface the combination with potassium chlorate and red phosphorus of calcium plumbate, substantially as and for the purposes set forth.

Signed at Cassel, in the German Empire, this 19th day of March, 1896.

CARL RUDOLPH ADOLPH GEORG SCHWIENING.

Witnesses:
    WILHELM WOLF,
    OTTO GROSSCURTH.